March 25, 1958    T. H. ROGERS, JR., ET AL    2,827,665
MANUFACTURE OF FLEXIBLE CELLULAR MATERIAL
Filed Oct. 26, 1954

*INVENTORS*
THOMAS H. ROGERS, JR.
NEWELL R. BENDER
THEODORE R. TEN BROECK

BY *R. L. Miller*
ATTORNEY

United States Patent Office 2,827,665
Patented Mar. 25, 1958

2,827,665

MANUFACTURE OF FLEXIBLE CELLULAR MATERIAL

Thomas H. Rogers, Jr., Akron, Newell R. Bender, Cuyahoga Falls, and Theodore R. Ten Broeck, Hudson, Ohio, assignors to The Goodyear Tire & Rubber Company, Akron, Ohio, a corporation of Ohio Application October 26, 1954, Serial No. 464,676

2 Claims. (Cl. 18—48)

This invention relates to the preparation of flexible cellular materials. More particularly, it relates to improved methods for manufacturing flexible elastomeric cellular structures from liquid reaction mixtures containing polyisocyanates and to improved products obtained by the use of these methods.

In casting flexible cellular products from a liquid reaction mixture, it is a usual practice to distribute the reaction mixture as evenly and uniformly as possible onto a horizontal casting surface by means of one or more pouring points or stations located above and in close proximity to the casting surface. The reaction mixture foams and sets while the mixture is supported by and in contact with the casting surface.

The production of flexible cellular structures from liquid polymeric reaction mixtures containing polyisocyanates is a relatively recent development. The reaction mixtures from which the cellular structures are made contain polymeric materials which are either liquid at room temperature or capable of being melted at relatively low temperatures. The polymeric materials contain active hydrogen atoms which react with the isocyanate groups to form a network of cross-linked molecular chains. The polyisocyanate not only functions as a cross-linker or curative for the polymeric material but also reacts with water provided in the liquid reaction mixture to form carbon dioxide which causes the liquid reaction mixture to expand and foam, with resultant formation of a flexible cellular structure which retains its foamed cellular character after the polymer has been cross-linked. Since the reaction between polyisocyanate and water to form the carbon dioxide gas takes place so rapidly, the casting of these reaction mixtures according to conventional methods presents certain problems.

As the liquid reaction mixture is distributed over a horizontal casting surface the portion of the mixture which is distributed first begins to foam and rise from the casting surface before the distribution of the balance of the reaction mixture can be accomplished. The rapid rise of that portion first distributed results in a series of lines of demarcation in the finished product as well as an unevenness in the level of the upper surface of the finished product. These undesirable results are believed to occur because the liquid reaction mixture first distributed rises from the casting surface when the foaming action begins, and flows back upon the reaction mixture subsequently distributed. Since the lines of demarcation and the unevenness in the upper surface of the finished product are undesirable from the standpoint of appearance, quality and waste, the method of casting the mixtures onto a horizontal casting surface has not proven to be satisfactory.

It is an object of this invention to provide an improved method for producing flexible, cellular products from liquid reaction mixtures containing an active-hydrogen-containing polymeric material, a polyisocyanate and water whereby a homogeneous, uniform structure is obtained. A further object is to provide an improved method for producing flexible, cellular compositions of the type described, in a substantially continuous manner. Still another object is to produce a cellular, flexible structure from a liquid reaction mixture of the type described which has a substantially uniform, flat top surface. Another object is to eliminate the necessity of trimming the finished product. Still another object is to eliminate the waste produced by trimming the finished product. Other objects will appear as the description proceeds.

This invention and the practice thereof will be more readily understood by referring to the accompanying drawings in which.

Figure 1:
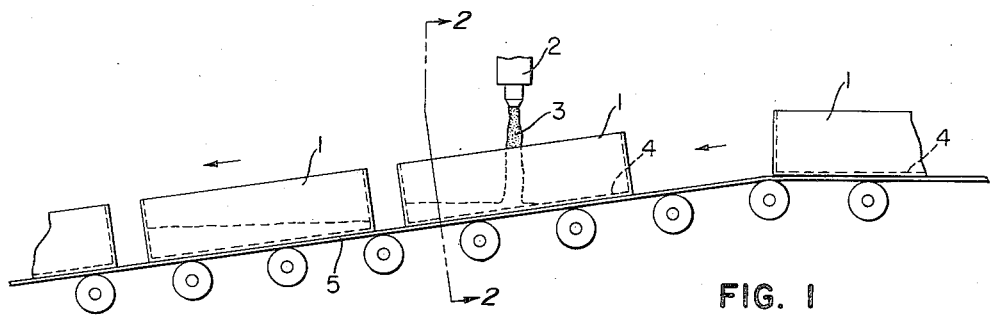
Fig. 1 is an elevation view of a part of a casting installation embodying the principle of the process of this invention.

In Fig. 1, a series of molds 1 is shown passing under a pouring station 2 from which a liquid reaction mixture 3 is distributed onto a casting surface 4 of the mold 1 which is carried along a moving surface 5.

Figure 2:
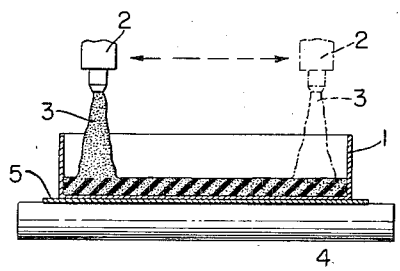
Fig. 2 is a section taken along line 2—2 of Fig. 1.

Fig. 2 shows the pouring station 2 oscillating across the width of the mold 1 as the mold passes under the pouring station 2. The oscillation of the pouring station 2 in this manner provides for the uniform distribution of the liquid reaction mixture 3 onto the casting surface 4.

Figure 3:
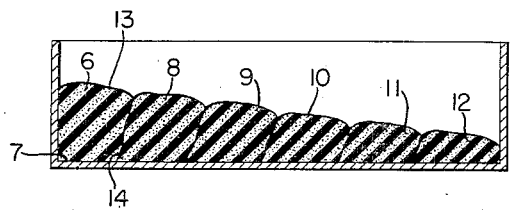
Fig. 3 is a longitudinal cross section of a mold containing a foaming reaction mixture cast onto a horizontal casting surface.

If, as discussed above, the liquid reaction mixture 3 is distributed onto the casting surface 4 while that surface is positioned in a substantially horizontal plane, a reaction takes place which produces a condition in the foaming mixture represented by Fig. 3 wherein that portion 6 of the reaction mixture first distributed onto the mold surface 7 has risen to a level above that of subsequently distributed portions 8, 9, 10, 11 and 12 which have had successively decreasing lengths of time in which to foam and expand. Since the foaming reaction mixture, though viscous, remains relatively fluid for some time after the reaction mixture is distributed, the first distributed portion 6, as it rises due to the foaming action, tends to flow back upon the lower level of the later distributed portion 8 causing unevenness in the upper surface 13 and the formation of a line of demarcation 14 extending across the width and through the depth of the foaming mixture. For the same reason, the subsequently poured portions 8, 9, 10, 11 and 12 cause additional lines of demarcation and additional unevenness in the upper surface of the foaming reaction mixture. Although the last poured portion 12 as well as the earlier poured portions 11, 10, 9 and 8, will eventually reach substantially the same height as the first poured portion 6, the lines of demarcation shown, as well as the unevenness in the upper surface, remain in the finished product. The lines of demarcation detract from the appearance of the finished product and also present weak points in its structure. The unevenness in the upper surface requires that the product be trimmed to provide uniform depth. The trimming is an additional operation, and the material trimmed represents waste, both conditions contributing to increased cost of production.

Figure 4:
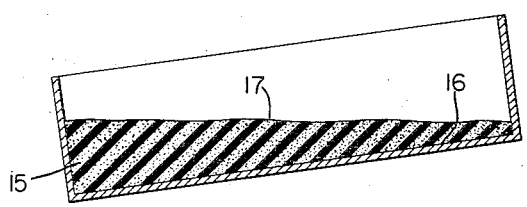
Fig. 4 is a similar longitudinal cross section of a mold containing a foaming reaction mixture cast according to the process of this invention.

Fig. 4 illustrates the condition of a foaming reaction mixture 15 which has been distributed onto the casting surface 16 which has been positioned in accordance with the practice of this invention. It has been discovered that, if the surface 16 onto which the reaction mixture 15 is distributed is positioned at an angle below horizontal so that the upper surface 17 of the foaming mixture is maintained in a substantially level condition while the reaction mixture is foaming, the unevenness in the upper surface and the lines of demarcation shown in Fig. 3 are eliminated.

The exact positioning of the surface onto which the reaction mixture is distributed will depend, in part, upon the rate of distribution of the reaction mixture and, in part, upon the rate of reaction which produces the rise of the reaction mixture from the casting surface. The rate of distribution is determined by the design of the casting installation while the rate of reaction is controlled by the particular polymeric material, the amounts of water and polyisocyanate added, the catalyst which is employed and the temperature of the reaction mixture. The important condition to be met in the production of the desired finished article is the maintenance of a substantially horizontal plane in the upper surface of the foaming reaction mixture at least for the time required to complete the distribution of the reaction mixture onto the casting surface and preferably for the additional time required to complete the foaming of the entire reaction mixture. In general it has been found that the positioning of the casting surface at an angle ranging from 1° to 10° below the horizontal, more particularly from 4° to 10° below the horizontal, and preferably approximately 6° below the horizontal, will provide a substantially horizontal plane in the upper surface of the foaming reaction mixture.

While the installation shown in Fig. 1 shows but one pouring station which oscillates across the width of the casting surface as that surface passes under the pouring stations, this specific method of distribution of the reaction mixture is not the only manner in which the distribution can be accomplished. For instance, a plurality of oscillating pouring stations or a plurality of stationary pouring stations located across the width of the pouring surface may be employed. Also, the spout of the pouring station may be flared out in a manner to provide a width of pour substantially equivalent to the width of the article being formed. So long as a uniform distribution is effected, the design and number of pouring stations may be varied in any way desired.

It should also be understood that, while the pouring surface 4 shown in Fig. 1 moves longitudinally in relation to the pouring station 2, a casting installation wherein the pouring station or stations move both longitudinally as well as across the pouring surface may be employed with equally beneficial effects. The invention may also be embodied in a casting installation in which the reaction mixture is distributed most efficiently through the use of pouring stations and casting surfaces which move simultaneously in relation to one another. In place of the individual molds 1 shown in Fig. 1, a continuous casting surface such as a belt with raised edges may be provided to produce the foamed cellular products in substantially continuous lengths. It will therefore be apparent that, in the practice of this invention, the details of the design of the casting installation may be varied so long as the upper level of the foaming reaction mixture is maintained in a substantially horizontal plane while the reaction mixture is being distributed and, preferably, also while the foaming reaction is being completed.

While the practice of this invention is generally applicable to the production of flexible cellular structures from reaction mixtures which generate gas in situ so fast that the gas forms before the reaction mixture is completely distributed upon the casting surface, it is particularly applicable to the formation of flexible cellular structures formed from reaction mixtures which contain an active-hydrogen-containing polymeric material, a polyisocyanate and water.

Examples of the active-hydrogen-containing polymeric materials are polyesters, polyesteramides, hydroxyl-containing polyethers and mixtures of two or more of these. The polyesters and polyesteramides are preferably formed from bifunctional materials such as dibasic carboxylic acids, amino carboxylic acids, glycols, amine alcohols and diamines. Small amounts of trifunctional materials may optionally be employed in preparing the active-hydrogen-containing polymeric materials. Polyesters and polyesteramides having an average molecular weight of from approximately 1000 to 5000, an acid number not greater than 5 and a hydroxyl number from 20 to 110 are preferred.

Any organic polyisocyanate or mixtures of polyisocyanates may be employed. The amount of polyisocyanate should be at least sufficient to cross link the active-hydrogen-containing polymeric material and to react with the water present to form carbon dioxide gas. In general it is preferred to use from 2 to 8 equivalents of isocyanate per mol of polymeric material. Representative examples of polyisocyanates which may be employed are the diisocyanates such as hexamethylene diisocyanate; para-phenylene diisocyanate; 4,4'-diphenylene diisocyanate; 1,5-naphthylene diisocyanate; 4,4'-diphenylene methane diisocyanate; the tolylene diisocyanates; 4,4'-diphenyl ethyl diisocyanate; 3,3'-dimethyl 4,4'-diphenyl diisocyanate; and 3,3'-dimethoxy 4,4'-diphenyl diisocyanate; the triisocyanates such as 4,4',4''-triphenyl methane diisocyanate; and toluene 2,4,6 triisocyanate; the tetraisocyanates such as 4,4'-dimethyl-diphenyl methane 2,2',5,5' tetraisocyanate and mixtures of polyisocyanates such as those described in U. S. Patent 2,683,730. Of these the tolylene diisocyanates; 3,3'-dimethyl 4,4'-diphenyl diisocyanate and 3,3'-dimethoxy 4,4'-diphenyl diisocyanate are particularly preferred.

The water in the reaction mixture is provided to form the carbon dioxide gas for foaming as well as to form possible points of cross linking the polymeric material.

Further examples of active-hydrogen-containing polymeric materials and polyisocyanates as well as a discussion of the chemical reactions involved will be found in United States Patent No. 2,625,535, an article in Rubber Chemistry and Technology for Oct.–Dec. 1950, pages 812–834 and Publication Board Report Number 1826.

In addition to the three ingredients discussed above the reaction mixture may optionally contain pigment fillers, reinforcing agents, coloring agents, anti-oxidants, and accelerators.

An example of a typical reaction mixture and the method for its preparation is shown below:

*Example 1*

A first mixture of 50 parts by weight of a polyester and 25.8 parts by weight of 2,4-tolylene diisocyanate was prepared. A second mixture was prepared containing 50 parts by weight of a polyester, 0.9 part by weight of water and 1.0 part by weight of a butyraldehyde/butylamine condensation product. The two mixtures were then thoroughly mixed together and immediately poured onto a casting surface positioned so that the upper level of the reaction mixture, as it foamed, was maintained in a substantially horizontal condition. After the foaming reaction was complete, the foamed mixture was permitted to stand at room temperature for ten minutes. The finished article removed from the mold was of uniform structure and thickness.

The polyester employed in both mixtures described in Example 1 was prepared from 80 mol. percent ethylene glycol, 20 mol percent propylene glycol, and adipic acid. The polyester had a hydroxyl number of 56.4, an acid number of 2.3, and an average molecular weight of approximately 1900. The butyraldehyde/butylamine condensation product which functions as a catalyst for the reaction was prepared from approximately 4 mols of butyraldehyde and 1 mol of butylamine. These condensation products and methods for their preparation are described in "The Journal of American Chemical Society" vol. 70, page 1624 for April 1948.

In the preparation of the reaction mixture it is preferred that the polyisocyanaate be mixed with a portion only of the active-hydrogen-containing polymeric material and that the catalyst, if any, and the water be mixed with another portion of the active-hydrogen-containing polymeric material and that these two portions be thoroughly mixed together immediately before the reaction mixture is to be poured. In this manner the initiation of the foaming reaction is delayed as long as possible while the thorough mixing of the reactants is being accomplished.

While certain representative embodiments and details have been shown for the purpose of illustrating the invention, it will be apparent to those skilled in this art that various changes and modifications may be made therein without departing from the spirit or scope of the invention.

We claim:

1. In the process of manufacturing a flexible, cellular product from a liquid reaction mixture comprising an active-hydrogen-containing polymeric material, an organic polyisocyanate and water, which includes the steps of distributing said reaction mixture onto a surface from which the reaction mixture expands, free of vertical restraint, by the generation of carbon dioxide in situ, and setting the expanded reaction mixture to form a flexible cellular product the improvement which comprises inclining the surface, onto which the reaction mixture is distributed, downwardly away from the point of distribution at an angle ranging from 4° to 10° below horizontal, so that a substantially horizontal condition is maintained in the upper level of the expanding reaction mixture while the liquid reaction mixture is being distributed and while the distributed reaction mixture is expanding.

2. In the process of manufacturing a flexible, cellular product from a liquid reaction mixture comprising an active-hydrogen-containing polymeric material, an organic polyisocyanate and water, which includes the steps of distributing said reaction mixture onto a surface from which the reaction mixture expands, free of vertical restraint, by the generation of carbon dioxide in situ, and setting the expanded reaction mixture to form a flexible cellular product the improvement which comprises distributing the liquid reaction mixture onto a surface inclined downwardly away from the point of distribution at an angle ranging from 4° to 10° below horizontal so that a substantially horizontal condition is maintained in the upper level of the expanding reaction mixture while the liquid reaction mixture is being distributed and while the distributed reaction mixture is expanding.

References Cited in the file of this patent

UNITED STATES PATENTS

| | | |
|---|---|---|
| 710,882 | Norton | Oct. 7, 1902 |
| 2,271,058 | Binns | Jan. 27, 1942 |
| 2,336,944 | Madge | Dec. 14, 1943 |
| 2,512,506 | Denis | June 20, 1950 |
| 2,595,964 | Lovell | May 6, 1952 |
| 2,639,252 | Simon et al. | May 19, 1953 |
| 2,716,778 | Beare | Sept. 6, 1955 |